US011025179B2

(12) United States Patent
Huo et al.

(10) Patent No.: US 11,025,179 B2
(45) Date of Patent: Jun. 1, 2021

(54) SYSTEM FOR CONTROLLING MOTORS, AND INVERTER AIR CONDITIONER

(71) Applicants: GD MIDEA AIR-CONDITIONING EQUIPMENT CO., LTD., Foshan (CN); MIDEA GROUP CO., LTD., Foshan (CN)

(72) Inventors: Junya Huo, Foshan (CN); Zhaobin Huang, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 16/829,724

(22) Filed: Mar. 25, 2020

(65) Prior Publication Data
US 2020/0228033 A1 Jul. 16, 2020

Related U.S. Application Data

(63) Continuation of application No. PCT/CN2017/113374, filed on Nov. 28, 2017.

(30) Foreign Application Priority Data

Oct. 30, 2017 (CN) .......................... 201711051932.9

(51) Int. Cl.
*H02P 5/74* (2006.01)
*H02P 21/18* (2016.01)
(Continued)

(52) U.S. Cl.
CPC ................ *H02P 5/74* (2013.01); *F24F 11/86* (2018.01); *H02P 21/18* (2016.02); *H02P 21/22* (2016.02); *H02P 2201/15* (2013.01)

(58) Field of Classification Search
CPC .. H02P 5/74; H02P 21/18; H02P 21/22; H02P 2201/15; F24F 11/86
See application file for complete search history.

(56) References Cited

U.S. PATENT DOCUMENTS

2004/0130284 A1   7/2004   Lee
2007/0013325 A1   1/2007   Kiuchi et al.
(Continued)

FOREIGN PATENT DOCUMENTS

CN   101729009 A   6/2010
CN   105548676 A   5/2016
(Continued)

OTHER PUBLICATIONS

World Intellectual Property Organization (WIPO) International Search Report for PCT/CN2017/113374 dated Aug. 1, 2018 7 Pages.

*Primary Examiner* — Zoheb S Imtiaz
(74) *Attorney, Agent, or Firm* — Anova Law Group PLLC (57) ABSTRACT

A motor control system includes a plurality of inverters each configured to be connected to a corresponding one of a plurality of motors, a plurality of current samplers coupled to the plurality of inverters, respectively, and each configured to sample a phase current of a corresponding one of the plurality of motors to generate a phase current signal for the corresponding one of the plurality of motors, and an operation controller including an analog-digital (AD) sampling circuit. The operation controller is configured to synchronously generate a plurality of triangular carrier signals each corresponding to one of the plurality of motors, and sample the phase current signals of the plurality of motors in a time sharing manner through the AD sampling circuit in rising half cycles or falling half cycles of the plurality of triangular carrier signals, respectively. The half cycles of the triangular
(Continued)

carrier signals for sampling the phase current signals of the plurality of motors are staggered in time from each other.

20 Claims, 5 Drawing Sheets (51) Int. Cl.
*H02P 21/22* (2016.01)
*F24F 11/86* (2018.01)

(56) References Cited

U.S. PATENT DOCUMENTS

2012/0153882 A1* 6/2012 Hong ...................... H02M 1/14
                                                                                 318/400.26
2018/0351483 A1* 12/2018 Arisawa .................... H02P 6/18

FOREIGN PATENT DOCUMENTS

CN         106687751 A     5/2017
CN         207427006 U     5/2018

* cited by examiner

SYSTEM FOR CONTROLLING MOTORS, AND INVERTER AIR CONDITIONER

CROSS-REFERENCE TO RELATED APPLICATIONS

This application is a continuation of International Application No. PCT/CN2017/113374, filed Nov. 28, 2017, which claims priority to Chinese Application No. 201711051932.9, filed Oct. 30, 2017, the entire contents of both of which are incorporated herein by reference.

TECHNICAL FIELD

The present disclosure relates to the technical field of controlling motors, in particular to a system for controlling motors and an inverter air conditioner.

BACKGROUND

In order to meet the energy-saving requirements of electromechanical products, more efficient permanent magnet synchronous motors have been used widely. In home appliances, such as air conditioners and refrigerators, compressors or DC (Direct Current) motors that are driven by inverter generally use sensorless permanent magnet synchronous motors. In practical applications, two or more permanent magnet synchronous motors are used in one home appliance. For example, the inverter air conditioner usually has a compressor having a permanent magnet synchronous motor and one or more fans having permanent magnet synchronous motor. When the Microcontroller Unit (MCU) controls the operation of the above permanent magnet synchronous motors, each permanent magnet synchronous motor needs an independent AD sampling circuit to sample the phase current of the motor, and obtain the position of the rotor of the motor through calculation, and further calculate a new voltage vector and output the new voltage vector according to the updated position of the rotor to control the continuous operation of the motor. Thus, in order to control the operation of the multiple permanent magnet synchronous motors mentioned above, the MCU may include corresponding multiple AD sampling circuits. The AD sampling circuit usually has a complicated circuit and high cost. In order to save costs, a low-cost MCU usually only has a separate AD sampling circuit. Therefore, it is difficult to sample the phase current of the two or more permanent magnet synchronous motors for the low-cost MCU, so that the multiple permanent magnet synchronous motors cannot be accurately controlled to operate.

The above contents are only used to assist in understanding the technical solution of the present disclosure, and does not mean that the above contents are related arts.

SUMMARY

The main objective of the present disclosure is to provide a system for controlling motors and an inverter air conditioner, which aims to solve the problem that in the existing motor control system, a low-cost MCU with only one AD sampling circuit cannot sample the phase currents of multiple permanent magnet synchronous motors normally.

In order to achieve the above objective, the present disclosure provides a system for controlling motors, including: a rectifier; a filter circuit; an operation controller including an AD sampling circuit; a voltage sampler; inverters; current samplers each connected to one corresponding inverter; and motors each connected to one corresponding inverter.

The rectifier is configured to perform a full-wave rectification of an AC input voltage, two output ends of the rectifier being connected to a DC bus.

The filter circuit and the inverters are connected in parallel with the DC bus in sequence, and the AC input voltage is converted into a DC bus voltage after being processed by the rectifier and the filter circuit, to provide power for the inverters.

An output end of each inverter is connected to each corresponding motor.

The voltage sampler is configured to sample a value of the DC bus voltage and input the value to the operation controller.

Each current sampler is configured to sample a phase current signal of each corresponding motor and input the phase current signal to the operation controller.

The operation controller is configured to control each inverter to drive each corresponding motor connected to each inverter to operate.

The phase current signal of each motor is timeshare sampled through the AD sampling circuit. The operation controller is configured to generate a pulse width signal according to the sampled phase current signal of the motor, the value of the DC bus voltage, and a target rotation speed value of the motor. The operation controller is also configured to synchronously generate a triangular carrier signal corresponding to each motor, and generate a PWM control signal for the inverter according to the triangular carrier signal and the pulse width signal, to drive each corresponding motor to operate.

The operation controller is configured to sample the phase current signal of each corresponding motor in a time-sharing manner through the AD sampling circuit during a rising half cycle or a falling half cycle of each triangular carrier signal, and half cycles of all the triangular carrier signals for sampling a phase current of each motor are staggered in time from each other.

In some embodiments, the motors include a first motor and a second motor, a ratio of a frequency of a first triangular carrier signal corresponding to a phase current of the first motor to a frequency of a second triangular carrier signal corresponding to a phase current of the second motor is 1:N, and N is greater than or equal to 1.

In some embodiments, N is greater than or equal to 1 and less than or equal to 5.

In some embodiments, when the ratio of the frequency of the first triangular carrier signal corresponding to the phase current of the first motor to the frequency of the second triangular carrier signal corresponding to the phase current of the second motor is 1:1, the process of the operation controller to sample the phase current signal of each corresponding motor in a time-sharing manner through the AD sampling circuit during a rising half cycle or a falling half cycle of each triangular carrier signal includes the operation controller sampling a phase current signal of the first motor during a rising half cycle of the first triangular carrier signal, and sampling a phase current signal of the second motor during a falling half cycle of the second triangular carrier signal. The rising half cycle of the first triangular carrier signal and the falling half cycle of the second triangular carrier signal form a cycle.

In some embodiments, when the ratio of the frequency of the first triangular carrier signal corresponding to the phase current of the first motor to the frequency of the second triangular carrier signal corresponding to the phase current of the second motor is 1:2, the process of the operation controller to sample the phase current signal of each corresponding motor in a time-sharing manner through the AD sampling circuit during a rising half cycle or a falling half cycle of each triangular carrier signal includes the operation controller sampling a phase current signal of the first motor during a rising half cycle of the first triangular carrier signal with a lower frequency, and sampling a phase current signal of the second motor during a rising half cycle in the cycle of the second triangular carrier signal with a higher frequency corresponding to the falling half cycle of another cycle composed by the falling half cycle and the rising half cycle of first triangular carrier signal.

In some embodiments, when the ratio of the frequency of the first triangular carrier signal corresponding to the phase current of the first motor to the frequency of the second triangular carrier signal corresponding to the phase current of the second motor is 1:2, the process of the operation controller to sample the phase current signal of each corresponding motor in a time-sharing manner through the AD sampling circuit during a rising half cycle or a falling half cycle of each triangular carrier signal includes the operation controller sampling a phase current signal of the first motor during a rising half cycle of the first triangular carrier signal with a lower frequency, and sampling a phase current signal of the second motor during a falling half cycle in the cycle of the second triangular carrier signal with a higher frequency corresponding to the falling half cycle of another cycle composed by the falling half cycle and the rising half cycle of first triangular carrier signal.

In some embodiments, when the ratio of the frequency of the first triangular carrier signal corresponding to the phase current of the first motor to the frequency of the second triangular carrier signal corresponding to the phase current of the second motor is 1:2, the process of the operation controller to sample the phase current signal of each corresponding motor in a time-sharing manner through the AD sampling circuit during a rising half cycle or a falling half cycle of each triangular carrier signal includes the operation controller sampling a phase current signal of the first motor during a falling half cycle of the first triangular carrier signal with a lower frequency, and sampling a phase current signal of the second motor during a rising half cycle in the cycle of the second triangular carrier signal with a higher frequency corresponding to the rising half cycle of another cycle composed by the falling half cycle and the rising half cycle of the first triangular carrier signal.

In some embodiments, when the ratio of the frequency of the first triangular carrier signal corresponding to the phase current of the first motor to the frequency of the second triangular carrier signal corresponding to the phase current of the second motor is 1:2, the process of the operation controller is configured to sample the phase current signal of each corresponding motor in a time-sharing manner through the AD sampling circuit during a rising half cycle or a falling half cycle of each triangular carrier signal includes the operation controller sampling a phase current signal of the first motor during a falling half cycle of the first triangular carrier signal with a lower frequency, and sampling a phase current signal of the second motor during a falling half cycle in the cycle of the second triangular carrier signal with a higher frequency corresponding to the rising half cycle of another cycle composed by the falling half cycle and the rising half cycle of the first triangular carrier signal.

In some embodiments, the motors include a first motor, a second motor and a third motor. A ratio of a frequency of a first triangular carrier signal corresponding to a phase current of the first motor to a frequency of a second triangular carrier signal corresponding to a phase current of the second motor to a frequency of a third triangular carrier signal corresponding to a phase current of the third motor being 1:M1:M2, M1 being greater than or equal to 2, and M2 being greater than or equal to 2.

In some embodiments, M1 is greater than or equal to 2 and less than or equal to 5; and M2 is greater than or equal to 2 and less than or equal to 5.

In some embodiments, the operation controller includes a position-speed estimation circuit configured to estimate a position of a rotor of the motor to obtain an estimated value of the rotor angle and an estimated value of the motor speed, a Q axis given current value calculation circuit configured to calculate a Q axis given current value according to the target rotation speed value of the motor and the estimated value of the motor speed, a D axis given current value calculation circuit configured to calculate a D axis given current value according to a maximum output voltage of the inverter and an output voltage amplitude of the inverter, and a current control circuit configured to calculate the pulse width signal according to the Q axis given current value, the D axis given current value, the estimated value of the motor speed, the value of the DC bus voltage, and a phase current value sampled from the motor, and generate the PWM control signal to the inverter according to the triangular carrier signal and the pulse width signal to drive the motor to operate.

In some embodiments, the system further includes a PFC circuit connected in parallel with the DC bus, an input end of the PFC circuit being connected to the rectifier, and an output end of the PFC circuit being connected to the filter circuit to perform a power factor correction on a pulsating DC power output by the rectifier.

In order to achieve the above objective, the present disclosure further provides an inverter air conditioner, which includes the system for controlling the motors.

The system for controlling the compressor includes a rectifier, a filter circuit, an operation controller, a voltage sampler, inverters, current samplers each connected to one corresponding inverter, and motors. The operation controller is configured to control each inverter to drive each corresponding motor to operate. The operation controller includes an AD sampling circuit, the phase current signal of each motor is timeshare sampled through the AD sampling circuit. The operation controller is configured to generate a pulse width signal according to the sampled phase current signal of the motor, the value of the DC bus voltage, and a target rotation speed value of the motor. The operation controller is also configured to synchronously generate a triangular carrier signal corresponding to each motor, and generate a PWM control signal for the inverter according to the triangular carrier signal and the pulse width signal, to drive each corresponding motor to operate. The operation controller is configured to sample the phase current signal of each corresponding motor in a time-sharing manner through the AD sampling circuit during a rising half cycle or a falling half cycle of each triangular carrier signal, and half cycles of all the triangular carrier signals for sampling a phase current of each motor are staggered in time from each other, for avoiding conflicts when sampling phrase currents of the motors through one AD sampling circuit of the operation controller. The phrase currents of the motors may be timeshare sampled by one AD sampling circuit, thus realizing the control of motors by low-cost MCU based on only one AD sampling circuit.

DETAILED DESCRIPTION OF THE EMBODIMENTS

The embodiments of the present disclosure are described in detail below. Examples of the embodiments are shown in the drawings. The same or similar reference numerals represent the same or similar elements or elements having the same or similar functions. The embodiments described below with reference to the drawings are exemplary and are intended to explain the present disclosure, but should not be construed as limiting the present disclosure.

Figure 1:
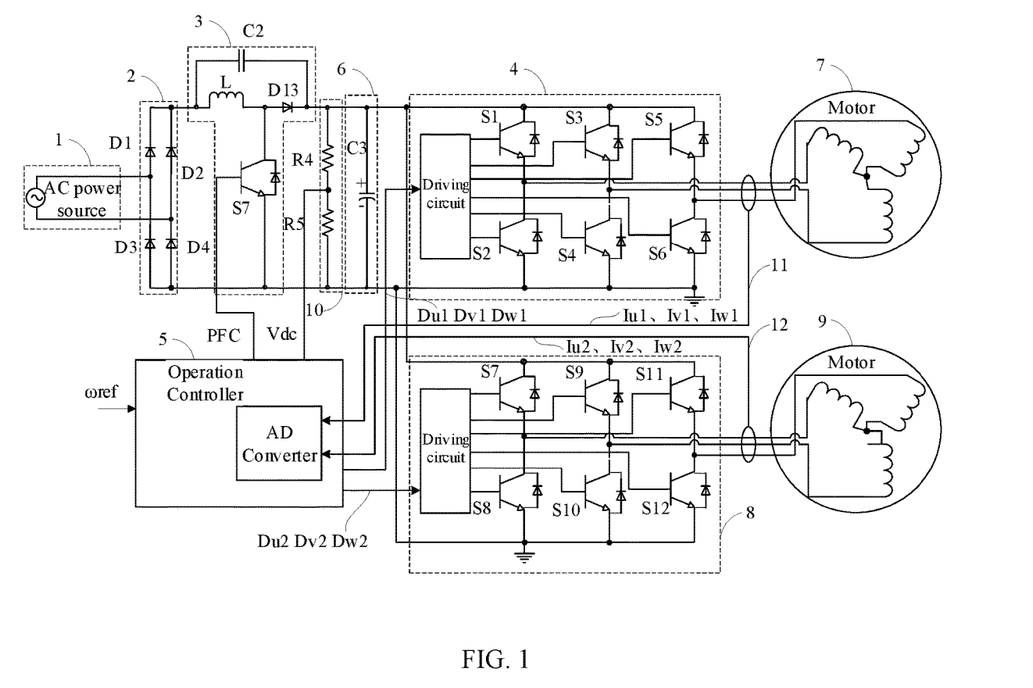
FIG. 1 is a schematic diagram of a circuit structure of a system for controlling motors according to an embodiment of the present disclosure.

Referring to FIG. 1, FIG. 1 is a schematic diagram of a circuit structure of a system for controlling motors, i.e., a motor control system, according to an embodiment of the present disclosure. For convenience of explanation, not all parts of the circuit structure are shown, and the details are as follows.

The system includes a rectifier 2, a filter circuit 6, an operation controller 5, a voltage sampler 10, inverters, current samplers each connected to one corresponding inverter, and motors each connected to one corresponding inverter. In the present embodiment, the inverters include an inverter 4 and an inverter 8. The inverter 4 is configured to drive a motor 7, and the inverter 8 is configured to drive a motor 9.

The rectifier 2 is configured to perform a full-wave rectification on the AC input voltage of the AC power source 1, and two output ends of the rectifier 2 are connected to a DC bus. Here, the rectifier 2 may include rectifier bridges stacked together, and four rectifier diodes, e.g., D1, D2, D3, D4, are in the rectifier 2 and constitute a full bridge rectifier circuit.

The filter circuit 6, the inverter 4 and the inverter 8 are connected in parallel with the DC bus in sequence, and the AC input voltage is converted into a DC bus voltage after being processed by the rectifier 2 and the filter circuit 6, to provide power for the inverter 4 and the inverter 8. The filter circuit mainly includes a first capacitor C3, and is configured to filter the pulsating direct current output by the rectifier 2.

The voltage sampler 10 is configured to sample a value of the DC bus voltage and input the value into the operation controller 5. Here, the voltage sampler 10 may be a simple voltage sampling circuit including a divider resistance.

A current sampler 11 is configured to sample a phase current signal of the motor 7 and input the phase current signal to the operation controller 5, and a current sampler 12 is configured to sample a phase current signal of the motor 9 and input the phase current signal to the operation controller 5.

The output end of the inverter 4 is connected to the motor 7, the output end of the inverter 8 is connected to the motor 9, and the operation controller 5 controls the inverter 4 and the inverter 8 simultaneously to drive the motor 7 and the motor 9 to operate. The inverter 4 includes a driving circuit and six switch transistors S1-S6 with freewheeling diodes, and the inverter 8 includes a driving circuit and six switch transistors S7-S12 with freewheeling diodes. The operation controller 5 outputs two three-phase PWM control signals to the driving circuit of the inverter 4 and the driving circuit of the inverter 12 respectively. The driving circuits are configured to drive six switch transistors S1-S6 and six switch transistors S7-S12 to operate according to the three-phase PWM control signals, and output three-phase currents to drive the motor 7 and the motor 9 to operate. Here, each of the inverter 4 and the inverter 8 may include an intelligent power module (IPM).

The operation controller 5 is configured to control each inverter to drive each corresponding motor to operate. The operation controller 5 includes an analog-digital (AD) sampling circuit which is configured to perform a time sharing sampling on the phase current signal of each motor. The AD sampling circuit can include, e.g., an AD converter. The operation controller 5 is configured to generate a pulse width signal according to the sampled phase current signal of the motor, the value of the DC bus voltage, and a target rotation speed value of corresponding motor. The operation controller 5 is also configured to synchronously generate a triangular carrier signal corresponding to each motor. Here, the triangular carrier signals are generated by a timer of the operation controller 5, that is, the timers that generate the triangular carriers are configured to be time synchronous, so the starting times of the triangular carrier signals are consistent. The operation controller 5 is further configured to generate a pulse width modulation (PWM) control signal according to the triangular carrier signals and the pulse width signal, the PWM control signal is transmitted to the inverter, to drive each corresponding motor to operate. As shown in FIG. 1, the operation controller 5 is configured to sample the phase current signals Iu1, Iv1, and Iw1 of the motor 7 in a time-sharing manner, and the operation controller 5 is also configured to sample the phase current signals Iu2, Iv2, and Iw2 of the motor 9 in the time-sharing manner. Then, the operation controller 5 is configured to generate pulse width signals Du1, Dv1, Dw1 and Du2, Dv2, Dw2 according to the sampled phase current signals, the value of the DC bus voltage, and target rotation speed values ωref of two motors (ωref includes target rotation speed values of two motors). Finally, the operation controller 5 is configured to generate two PWM control signals including the above-mentioned pulse width signals according to the triangular carrier signal corresponding to each motor and the above-mentioned pulse width signals to control the operation of the two motors through the inverter 4 and the inverter 8.

The operation controller 5 is configured to sample the phase current signal of each corresponding motor in the time-sharing manner through the AD sampling circuit during a rising half cycle or a falling half cycle of each triangular carrier signal, and half cycles of all the triangular carrier signals when the phase current of each motor is sampled and the rising half cycles or the falling half cycles are staggered from each other. That is, the half cycles of the triangular carrier signals used for sampling the phase current signals of different motors do not overlap with each other.

The motor herein may be a permanent magnet synchronous motor, such as a compressor for an inverter air conditioner, or a compressor for an inverter refrigerator. The DC motor is usually a permanent magnet synchronous motor.

Figure 2:
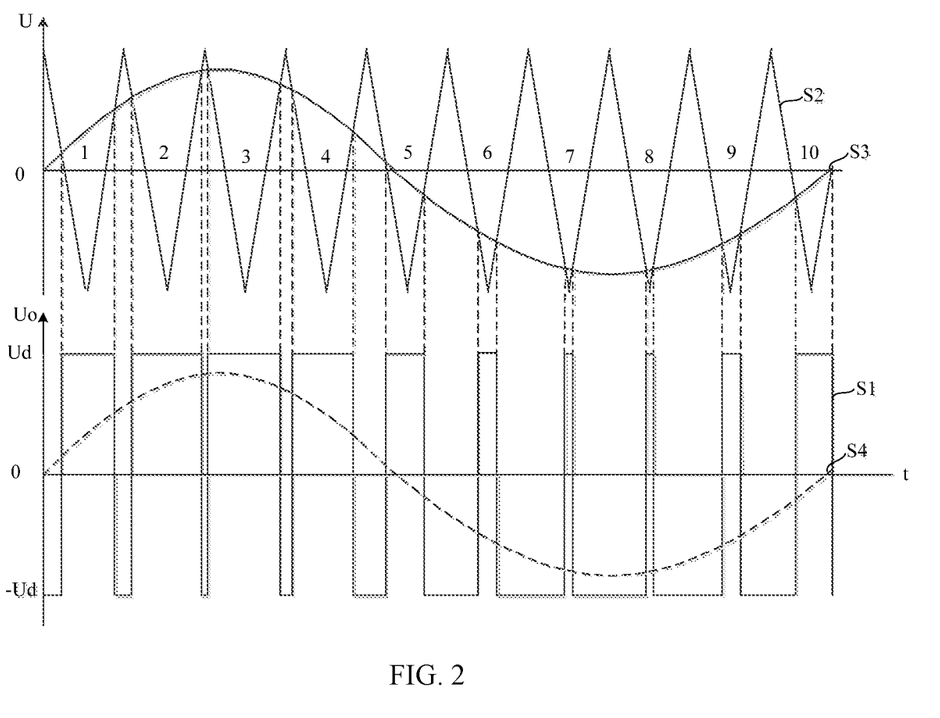
FIG. 2 is a schematic diagram of a sine wave modulation waveform of a PWM signal of a system for controlling motors according to an embodiment of the present disclosure.

The operation controller 5 is configured to control the motor 7 according to the sampled phase current signals of the motor 7. Meanwhile, the operation controller 5 is configured to output six PWM control signals to the inverter 4. The PWM control signals are calculated according to the value of the DC bus voltage output by the rectifier 2 and the target rotation speed instruction of the motor 7, and the PWM control signals are based on the sine wave modulation principle on a macro scale. As shown in FIG. 2, the sine wave voltage signal S3 is adopted to modulate the isosceles triangle carrier S2 to finally obtain one PWM control signal, the waveform of the PWM control signal is shown as S1. The PWM cycle T of the PWM control signal generally ranges from 100 us to 250 us, and finally the motor 7 is driven by the inverter 4. Due to the inductance characteristics of the motor windings, a sinusoidal waveform is formed on the three windings of the motor 7, the waveform is shown as S4 in the dotted part in FIG. 2.

Because the frequency of PWM is high, when the operation controller 5 actually performs the pulse width calculation and finally generates the PWM control signal, it is actually implemented based on the voltage space vector pulse width modulation (SVPWM). That is, the pulse width signal is generated by the calculation, the continuous triangular carrier signal is generated by the timer of the operation controller 5, the PWM control signal is finally outputted by comparing the above pulse width signal with the triangular carrier signal. There are six PWM control signals, which control the operations of the six switch transistors S1 to S6 of the inverter 4. Finally, the inverter 4 outputs a three-phase driving signal to drive the motor 7.

The control of the motor 9 by the operation controller 5 is the same as the control of the motor 7, the description of which is not repeated here.

Figure 3:
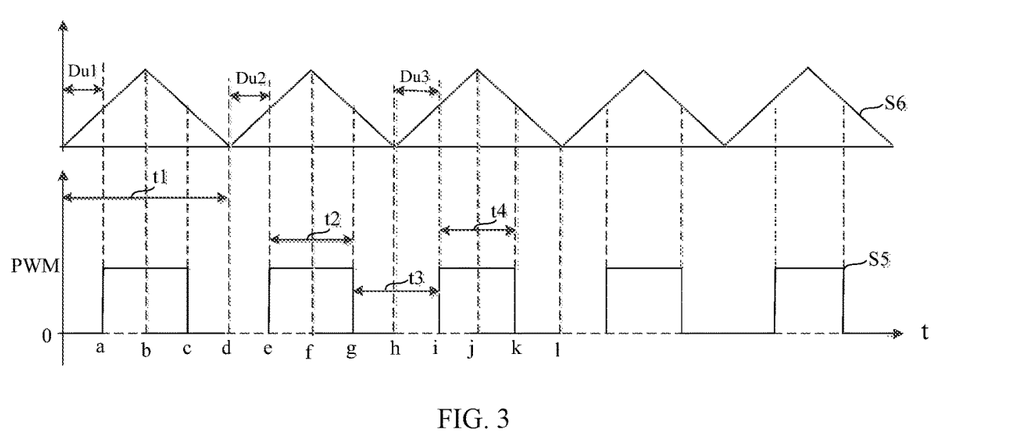
FIG. 3 is a schematic diagram of a correspondence relationship between a PWM signal and an isosceles triangle carrier signal of a system for controlling motors according to an embodiment of the present disclosure.

As shown in FIG. 3, when the operation controller 5 controls the motor 7, the schematic diagram of the triangular carrier signal waveform generated by the timer of the operation controller 5 is shown as S6. The pulse width signals are shown as Du1, Du2, Du3 in the Figure. The actual software for generating the waveforms of the PWM control signals is configured to send the pulse width signal value to the comparison register, and generate one PWM control signal S5 through the comparison register based on the triangular carrier S6. Each triangular carrier cycle corresponds to one of the PWM control signal cycles. Each triangle in triangular carrier signals S6 is an isosceles triangle. The crest of each isosceles triangle is at the same time as the center of the effective pulse width of the PWM control signal in the carrier cycle of this isosceles triangle. As shown in FIG. 3, the crest of the first isosceles triangle is at the same time as the center b of the effective pulse width of the first PWM pulse waveform including moments a to c. Different PWM control signals with different effective pulse widths are finally generated through different pulse width signals. When six PWM control signals are added to the six switch transistors of the inverter 4 and configured to control the motor 7, three vectors with a 120° angle difference from each other are finally formed, and a voltage vector signal that changes with time is synthesized. The voltage vector signal has a constant amplitude and rotates at the same frequency as a sine wave, such that the motor 7 may operate under the control of the voltage vector signal.

When the operation controller 5 needs to control several inverters, that is, two or more inverters, to drive several motors, since there is only one AD sampling circuit in the operation controller 5, only the phase current signal of one motor can be sampled at one time. Therefore, the above-mentioned several motors are controlled macroscopically, and the principle of timeshare sampling is used to control the above-mentioned several motors microscopically, that is, the phase currents of the several motors are timeshare sampled. However, since the operation controller 5 generates a PWM control signal to the inverter based on the triangular carrier signal and the pulse width signal to drive the corresponding motor to operate. When there are several motors, the operation controller 5 also needs to generate several triangular carrier signals through the timer, and finally generate the PWM control signal to the corresponding inverter according to the pulse width signal corresponding to each motor, and finally drive the aforementioned several motors to operate. When the phase current of the motor is specifically sampled, it is sampled at the rising or falling edge of the PWM effective pulse width corresponding to the rising or falling part in the triangular carrier cycle, thereby calculating at the time corresponding to the peak or valley time of the triangular carrier to finally obtain a pulse width signal, and generate a PWM control signal based on the pulse width signal and the triangular carrier signal to update it in the next PWM control cycle. Since the phase current of the motor is sampled at the rising or falling edge of the PWM effective pulse width corresponding to the rising or falling part of the triangular carrier cycle, the effective pulse width of the PWM changes with the different pulse width signal. Thus, the position moment of the rising or falling edge is not fixed. When there are several motors, the rising or falling edges of the PWM effective pulse widths corresponding to several motors may completely be the same in time, so there will be conflicts at the sampling time. Therefore, how to ensure that the phase current sampling moments corresponding to the motors do not conflict is a problem to be solved in the embodiments of the present disclosure.

In order to solve the above problems, in the system for controlling the motor according to the embodiments of the present disclosure, the operation controller 5 is configured to sample the phase current of each motor and ensure that the rising half cycle or falling half cycle of each triangular wave corresponding to the phase current of each motor is staggered in time, in order to realize that sampling phase current of each motor does not interfere with each other through the AD sampling circuit.

Figure 4:
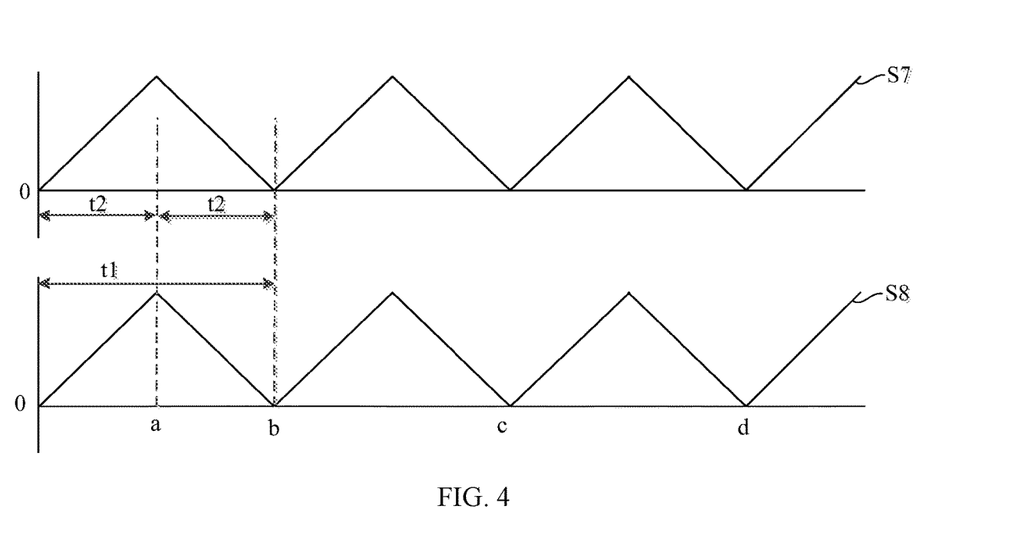
FIG. 4 is a schematic diagram of two triangular carrier signal waveforms with a frequency ratio of 1:1 when sampling the phase currents of two motors of a system for controlling motors according to an embodiment of the present disclosure.

The operation controller 5 for controlling two motors is taken as an example. The two motors include a first motor and a second motor, a ratio of a frequency of a first triangular carrier signal corresponding to a phase current of the first motor to a frequency of a second triangular carrier signal corresponding to a phase current of the second motor is 1:N, timers corresponding to two triangular carrier signals are synchronized, and N is greater than or equal to 1. In some embodiments, N is an integer greater than or equal to 1 and less than or equal to 5. When N is equal to 1, that is, a ratio of a frequency of a first triangular carrier signal corresponding to a phase current of the first motor to a frequency of a second triangular carrier signal corresponding to a phase current of the second motor is 1:1. As shown in FIG. 4, the triangular carrier signal corresponding to sampling the phase current of the motor 7 is S7, the triangular carrier signal corresponding to sampling the phase current of the motor 9 is S8, and the two are timed synchronously, that is, the starting time 0 is the same. At this time, the phase current of the motor 7 is sampled during the rising half cycle of the triangular carrier signal S7, that is, from time 0 to time a. The phase current of the motor 9 is sampled during the falling half cycle of the triangular carrier signal S8 in the cycle corresponding to the above half cycle in S7, that is, in the time period from time a to time b. In some embodiments, in the corresponding schematic diagram of the triangular carrier and the PWM control signal waveform shown in FIG. 3, if it is during the rising half cycle of the triangular carrier S7, the phase current signal of the motor 7 is sampled at the rising edge of the effective pulse width of the PWM control signal, if it is in the falling half cycle of the triangular carrier S8, the phase current signal of the motor 9 is sampled at the falling edge of the effective pulse width of another PWM control signal. The specific time of the rising or falling edge of the PWM effective pulse width depends on the pulse width corresponding to the PWM control signal. Therefore, by setting the phase current sampling of the two motors to correspond to the rising half cycle and the falling half cycle of the two triangular carrier signals, respectively, the conflicts caused by the same sampling times of the two motors can be completely avoided, and time-sharing sampling can be finally realized. The purpose is to achieve accurate time-sampling of the phase currents of the two motors through an AD sampling circuit, and finally generate a PWM control signal to achieve accurate and simultaneous control of the operation of the two motors. For example, if both are sampled during the rising half cycle of the triangular carrier, when the two effective pulse widths are the same, the two sampling moments are the same. Since the operation controller 5 has only one AD sampling circuit, a timeshare sampling cannot be achieved due to a conflict in sampling time. In some embodiments, when the phase currents of the motor 7 and the motor 9 are sampled, the phase currents of the motor 7 may also be sampled in the falling half cycle of the triangular carrier signal S7, that is, in the time period from time a to time b. The phase current of the motor 9 is sampled during the falling half cycle of the triangular carrier signal S8, that is, from time 0 to time a, as long as the two are in different half cycles of the triangular carrier signal.

In the embodiments of the present disclosure, the system for controlling motors includes a rectifier 2, a filter circuit 6, an operation controller 5 including an AD sampling circuit, a voltage sampler, inverters, current samplers each connected to one corresponding inverter, and motors each connected to one corresponding inverter. The operation controller 5 is configured to control each inverter to drive each corresponding motor connected to each inverter to operate. The phase current signal of each motor is timeshare sampled through the AD sampling circuit. The operation controller 5 is configured to generate a pulse width signal according to the sampled phase current signal of the motor, the value of the DC bus voltage, and a target rotation speed value of the motor. The operation controller 5 is also configured to synchronously generate triangular carrier signals corresponding to each motor, and generate a PWM control signal to the inverter according to the triangular carrier signals and the pulse width signal, to drive each corresponding motor to operate. The operation controller 5 is configured to sample the phase current signal of each corresponding motor in a time-sharing manner through the AD sampling circuit during a rising half cycle or a falling half cycle of each triangular carrier signal, and half cycles of all the triangular carrier signals for sampling a phase current of each motor are staggered in time from each other. As such, conflicts in sampling the line currents of multiple motors through one AD sampling circuit of the operation controller 5 are avoided, and time-sharing sampling of the phase currents of the aforementioned several motors based on one AD sampling circuit is successfully implemented, which achieves the control of several motors based on a low-cost MCU with only one AD sampling circuit.

In some embodiments, the ratio of the frequency of the first triangular carrier signal corresponding to the phase current of the first motor to the frequency of the second triangular carrier signal corresponding to the phase current of the second motor is 1:2, the process of the operation controller to sample the phase current signal of each corresponding motor in a time-sharing manner through the AD sampling circuit during a rising half cycle or a falling half cycle of each triangular carrier signal includes the operation controller 5 sampling the phase current signal of the first motor during the rising half cycle of the first triangular carrier signal with a smaller frequency, and to sample a phase current signal of the second motor during a rising half cycle in the cycle of the second triangular carrier signal with a higher frequency corresponding to the falling half cycle of another cycle composed by the falling half cycle and the rising half cycle of first triangular carrier signal.

Figure 5:
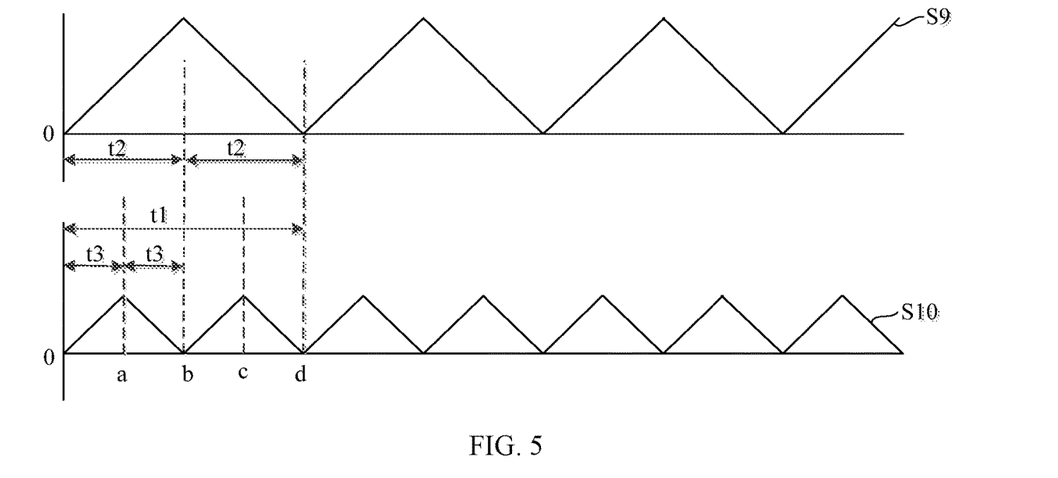
FIG. 5 is a schematic diagram of two triangular carrier signal waveforms with a frequency ratio of 1:2 when sampling the phase currents of two motors of a system for controlling motors according to an embodiment of the present disclosure.

In some embodiments, as shown in FIG. 5, the triangular carrier signal for sampling the phase current of the motor 7 is S9, the triangular carrier signal for sampling the phase current of the motor 9 is S10, and the two phase currents are timed synchronously, that is, the starting times 0 for sampling the two phase currents are the same. S10 has twice the frequency of S9. The phase current signal of the motor 7 is sampled during the rising half cycle of the triangular carrier signal S9, that is, the time period from time 0 to time b. Meanwhile, the phase current signal of the motor 9 is sampled during a rising half cycle (time b to time c) of the triangular carrier signal S10 of the falling half cycle (time b to time d) of the triangular carrier signal S9 corresponding to the rising half cycle of the triangular carrier signal S9. Since the sampling time of the triangular carrier signal S10 is within the falling half cycle of the triangular carrier signal S9, the two sampling times are staggered from each other, and will not conflict.

In some embodiments, the phase current signal of the motor 7 is sampled during the rising half cycle of the triangular carrier signal S9, that is, from time 0 to time b. Meanwhile, the phase current signal of the motor 9 is sampled during a falling half cycle (time c to time d) of the triangular carrier signal S10 of the falling half cycle (time b to time d) of the triangular carrier signal S9 corresponding to the rising half cycle of the triangular carrier signal S9. The two sampling times are staggered from each other, and will not conflict.

In some embodiments, the phase current signal of the motor 7 is sampled during the falling half cycle of the triangular carrier signal S9, that is, the time period from time b to time d. Meanwhile, the phase current signal of the motor 9 is sampled during a rising half cycle (time 0 to time a) of the triangular carrier signal S10 of the rising half cycle (time 0 to time b) of the triangular carrier signal S9 corresponding to the falling half cycle of the triangular carrier signal S9. The two sampling times are staggered from each other, and will not conflict.

In some embodiments, the phase current signal of the motor 7 is sampled during the falling half cycle of the triangular carrier signal S9, that is, the time period from time b to time d. Meanwhile, the phase current signal of the motor 9 is sampled during a falling half cycle (time a to time b) of the triangular carrier signal S10 of the rising half cycle (time 0 to time b) of the triangular carrier signal S9 corresponding to the falling half cycle of the triangular carrier signal S9. The two sampling times are staggered from each other, and will not conflict.

Through the above-mentioned setting of the frequency ratio of the two triangular carrier signals to 1:2, the sampling times of the phase currents of the two motors are staggered, and will not conflict with each other. In this way, an MCU based on an AD sampling circuit can control two motors simultaneously.

The above is for the case where the ratio of the frequency of the first triangular carrier signal corresponding to the phase current of the first motor to the frequency of the second triangular carrier signal corresponding to the phase current of the second motor is 1:2. When N is another value greater than 2, e.g., the frequency ratio of two triangular carrier signals is 1:3, since the cycle of the first triangular carrier signal with a smaller frequency is three times of the cycle of the second triangular carrier signal with a higher frequency, the two sampling times are more likely to be staggered from each other when sampling. For example, the phase current of the first motor is sampled during the rising half cycle of the triangular carrier signal with a lower frequency, and the phase current of the second motor is sampled during the rising or falling half cycle of the second triangular carrier signal corresponding to the falling half cycle of the first triangular carrier with the lower frequency, thereby staggering sampling times and avoiding sampling conflicts.

In some embodiments, the motors include a first motor, a second motor and a third motor. A ratio of a frequency of a first triangular carrier signal corresponding to a phase current of the first motor to a frequency of a second triangular carrier signal corresponding to a phase current of the second motor to a frequency of a third triangular carrier signal corresponding to a phase current of the third motor is 1:M1:M2. The timers corresponding to the three triangular carrier signals are synchronized, and M1 is an integer greater than or equal to 2, M2 is an integer greater than or equal to 2. In some embodiments, M1 is greater than or equal to 2 and less than or equal to 5, and M2 is greater than or equal to 2 and less than or equal to 5.

The present embodiment relates to a system for controlling three motors. Compared to the control circuit for the system for controlling two motors as shown in FIG. 1, the control circuit for the system for controlling three motors further includes another one inverter and another one motor. That is, another inverter (namely a third inverter) is added and connected in parallel with the DC bus. The third motor is also connected to the output end of the third inverter, and one more PWM control signal from the operation controller is transmitted to the third inverter, and another current sampler is added to sample and input the phase current of the third motor to the operation controller.

Figure 6:
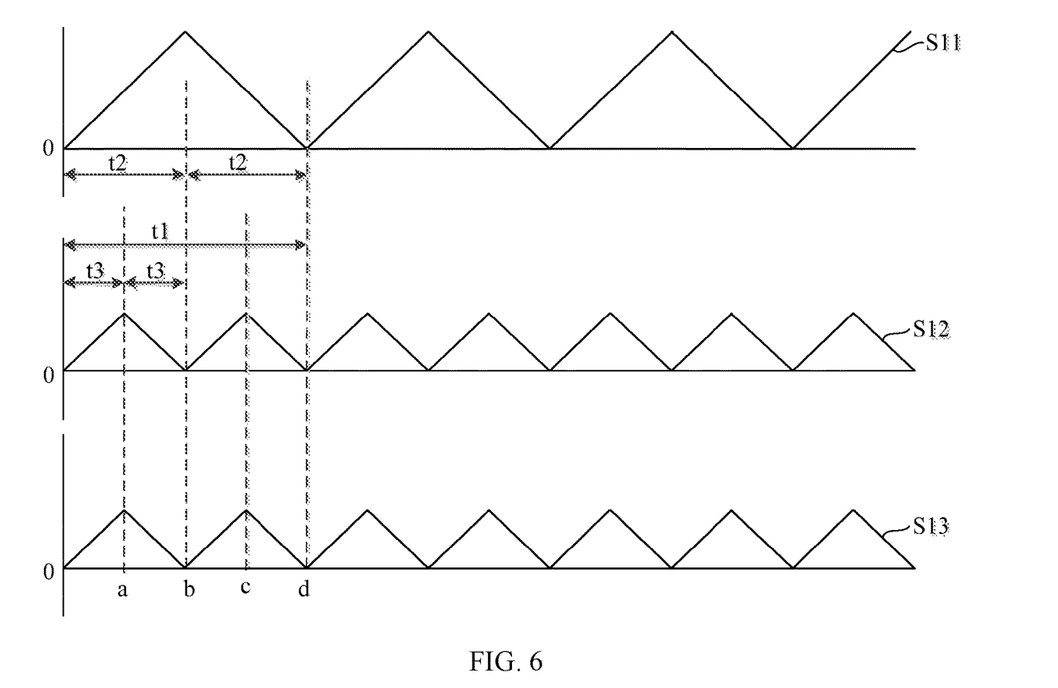
FIG. 6 is a schematic diagram of three triangular carrier signal waveforms with a frequency ratio of 1:2:2 when sampling the phase currents of three motors of a system for controlling motors according to an embodiment of the present disclosure.

In some embodiments, when M1 and M2 are both equal to 2, that is, a ratio of the frequency of the first triangular carrier signal corresponding to the phase current of the first motor to the frequency of the second triangular carrier signal corresponding to the phase current of the second motor to the frequency of the third triangular carrier signal corresponding to the phase current of the third motor is 1:2:2. As shown in FIG. 6, the triangle carrier signal for sampling the phase current of the first motor is S11, the triangle carrier signal for sampling the phase current of the second motor is S12, and the triangle carrier signal for sampling the phase current of the third motor is S13. The frequency ratio of the triangular carrier signals corresponding to S11, S12, and S13 is 1:2:2. When the phase currents of the three motors are sampled, in some embodiments, the phase current of the first motor is sampled during the rising half cycle of the frequency triangle carrier signal S11, that is, from time 0 to time b, and the phase current of the second motor is sampled during the rising half cycle of the frequency triangle carrier signal S12 of the falling half cycle (time b to time time d) of the frequency triangle carrier signal S11, and the phase current of the third motor is sampled during the rising half cycle of the frequency triangle carrier signal S13 of the falling half cycle (time b to time d) of the frequency triangle carrier signal S11. As such, the sampling times of the three are staggered from each other, and will not conflict.

When a ratio of the frequency of the first triangular carrier signal corresponding to the phase current of the first motor to the frequency of the second triangular carrier signal corresponding to the phase current of the second motor to the frequency of the third triangular carrier signal corresponding to the phase current of the third motor is 1:2:2, in addition to the setting method of the sampling time mentioned above, there are other setting methods. For example, the phase current of the first motor is sampled during the falling half cycle of the frequency triangle carrier signal S11, that is, from time b to time d, and the phase current of the second motor is sampled during the rising half cycle (time 0 to time a) of the frequency triangle carrier signal S12 of the rising half cycle (time 0 to time b) of the frequency triangle carrier signal S11, and the phase current of the third motor is sampled during the falling half cycle (time a to time b) of the frequency triangle carrier signal S13 of the rising half cycle (time 0 to time b) of the frequency triangle carrier signal S11. As such, the sampling times of the three are staggered from each other, and will not conflict.

Figure 7:
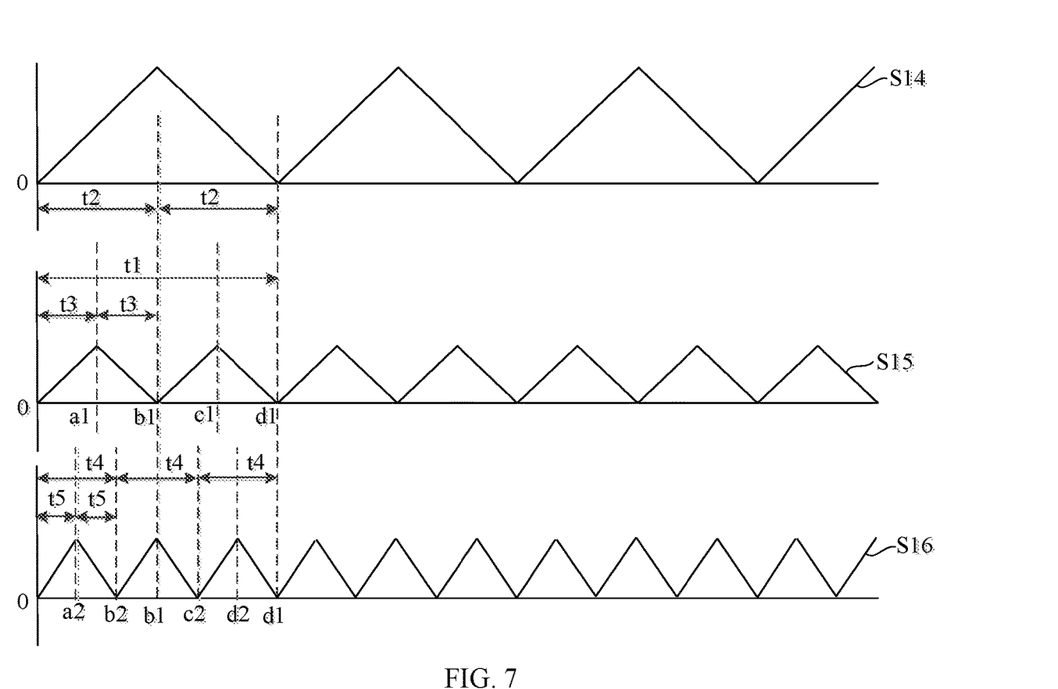
FIG. 7 is a schematic diagram of three triangular carrier signal waveforms with a frequency ratio of 1:2:3 when sampling the phase currents of three motors of a system for controlling motors according to an embodiment of the present disclosure.

When M1 is equal to 2, and M2 is equal to 3, a ratio of the frequency of the first triangular carrier signal corresponding to the phase current of the first motor to the frequency of the second triangular carrier signal corresponding to the phase current of the second motor to the frequency of the third triangular carrier signal corresponding to the phase current of the third motor is 1:2:3. As shown in FIG. 7, the triangle carrier signal for sampling the phase current of the first motor is S14, the triangle carrier signal for sampling the phase current of the second motor is S15, and the triangle carrier signal for sampling the phase current of the third motor is S16. The frequency ratio of the triangular carrier signals S14, S15, and S16 is 1:2:3. When the phase currents of the three motors are sampled, in some embodiments, the phase current of the first motor is sampled during the rising half cycle of the triangle carrier signal S14 with a lowest frequency, that is, the time period from time 0 to time b1, and the phase current of the second motor is sampled during the rising half cycle (time b1 to time c1) of the frequency triangle carrier signal S15 with a higher frequency corresponding to the falling half cycle (time b1 to time d1) of the frequency triangle carrier signal S14, and the phase current of the third motor is sampled during the falling half cycle (time d2 to time d1) of the frequency triangle carrier signal S16 with the highest frequency corresponding to the falling half cycle (time c1 to time d1) of the frequency triangle carrier signal S15. As such, the three sampling times are staggered from each other, and will not conflict. Compared to the case where the frequency ratio of the three triangular carrier signals is 1:2:2, the frequency of the third triangular carrier is high, so its cycle is smaller, and it is easier to stagger the sampling times to achieve no conflicts in sampling time. In some embodiments, there are other ways to set the sampling time, which can be easily obtained from FIG. 7.

Figure 8:
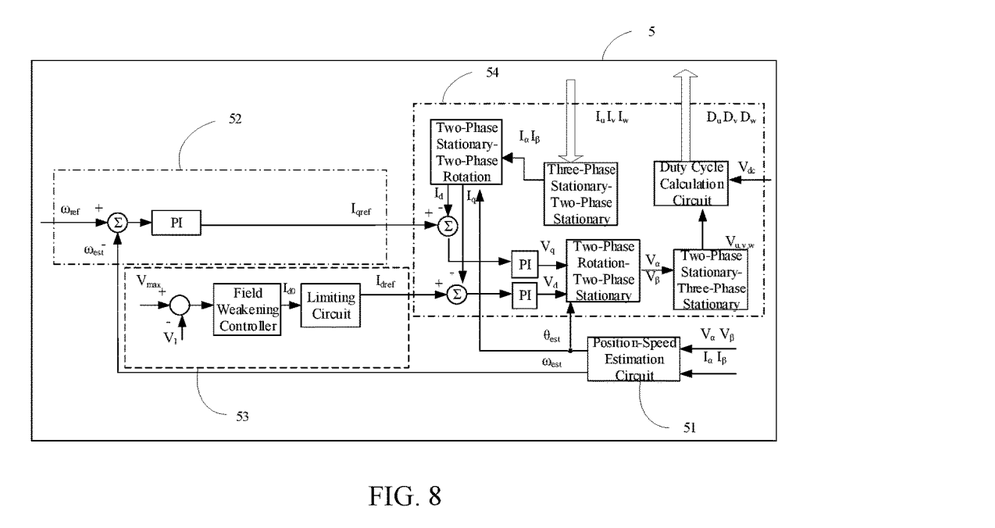
FIG. 8 is a schematic diagram of the circuit structure of an operation controller of a system for controlling motors according to an embodiment of the present disclosure.

In some embodiments, as shown in FIG. 8, the operation controller 5 of the system for controlling the motors in the present embodiment further includes a position-speed estimation circuit 51 configured to estimate a position of a rotor of the motor to obtain an estimated value $\theta_{est}$ of the rotor angle and an estimated value $\omega_{est}$ of the motor speed of the motor 7, a Q axis given current value $I_{qref}$ calculation circuit 52 configured to calculate the Q axis given current value $I_{qref}$ according to the target rotation speed value $\omega_{ref}$ of the motor and the estimated value $\omega_{est}$ of the motor speed, a D axis given current value $I_{dref}$ calculation circuit 53 configured to calculate the D axis given current value $I_{dref}$ according to a maximum output voltage $V_{max}$ of the inverter 4 and an output voltage amplitude $V_1$ of the inverter 4, and a current control circuit 54 configured to calculate the pulse width signal according to the Q axis given current value $I_{qref}$, the D axis given current value $I_{dref}$, the estimated value $\omega_{est}$ of the motor speed, the value $V_{dc}$ of the DC bus voltage, and phase current values $I_u$, $I_v$ and $I_w$ sampled from the motor, and generate the PWM control signal to the inverter 4 according to the triangular carrier signal and the pulse width signal to drive the motor 7 to operate.

Each of the above-mentioned circuits is described with respect to the motor 7 in FIG. 1 controlled by the operation controller 5 as an example. For other motors, such as the motor 9, the corresponding circuits and functions are same as the circuits and functions for the motor 7, and the description will not be repeated here.

In some embodiments, the motor 7 may be a position-sensorless motor, i.e., a motor without position sensor. When the position-speed estimation circuit 51 determines the estimated value $\theta_{est}$ of the rotor angle and the estimated value $\omega_{est}$ of the motor speed of the motor 7, the above-mentioned functions can be implemented by the flux observation method. In some embodiments, the estimated effective magnetic flux of the compressor motor in the α and β axis directions of the two-phase stationary coordinate system is calculated according to the voltage $V_\alpha$ and voltage $V_\beta$, current $I_\alpha$ and current $I_\beta$ on the two-phase stationary coordinate system. Formula (1) is as follows:

$$\begin{cases} \hat{\lambda}_\alpha = \frac{1}{s}[V_\alpha - I_\alpha R] - L_q I_\alpha \\ \hat{\lambda}_\beta = \frac{1}{s}[V_\beta - I_\beta R] - L_q I_\beta \end{cases} \quad (1)$$

$\hat{\lambda}_\alpha$ and $\hat{\lambda}_\beta$ are estimated values of the effective magnetic flux of the motor in the α and β axis directions, respectively, and $V_\alpha$ and $V_\beta$ are the voltages in the α and β axis directions, respectively. $I_\alpha$ and $I_\beta$ are the currents in the α and β axis directions, R is the stator resistance, and $L_q$ is the q axis flux linkage of the motor.

Then, the estimated value $\theta_{est}$ of the rotor angle and the estimated value $\omega_{est}$ of the motor speed of the compressor motor are calculated according to the following formula (2):

$$\begin{cases} \omega_{e0} = \left(K_{p\_pll} + \frac{K_{i\_pll}}{s}\right)\theta_{err} \\ \theta_e = \frac{1}{s}\omega_{e0} \\ \omega_{est} = \frac{\omega_f}{s + \omega_f}\omega_{e0} \end{cases} \quad (2)$$

$K_{p\_pll}$ and $K_{i\_pll}$ are proportional integral parameters, $\theta_{err}$ is an estimated deviation angle value, and $\omega_f$ is a bandwidth of the speed low-pass filter.

In some embodiments, the Q axis given current value calculation circuit 52 includes a superposition unit and a PI regulator. The superposition unit is configured to calculate the difference between the target speed value $\omega_{ref}$ of the motor and the estimated speed value $\omega_{est}$ of the motor. The PI regulator is configured to perform PI adjustment according to the difference between the target speed value $\omega_{ref}$ of the motor and the estimated speed value $\omega_{est}$ of the motor output by the superposition unit to output a Q axis given current value $I_{qref}$.

In some embodiments, the D axis given current value calculation circuit 53 includes a field weakening controller and a limiting circuit. The field weakening controller is configured to calculate the maximum output voltage $V_{max}$ of the inverter and the output voltage amplitude $V_1$ of the inverter to obtain the initial value $I_{d0}$ of the D axis given current value. The limiting circuit is configured to perform limiting processing on the D axis given current value initial value $I_{d0}$ to obtain the D axis given current value $I_{dref}$.

In the embodiments of the present disclosure, the field weakening controller may calculate the initial value $I_{d0}$ of the D axis given current value according to the following formula (3).

$$I_{d0} = \frac{K_i}{s}[(V_1 - V_{max})] \quad (3)$$

$I_{d0}$ is the initial value of the D axis given current value, $K_i$ is the integral control coefficient, $$V_1 = \sqrt{v_d^2 + v_q^2}, \quad V_{max} = \frac{\sqrt{3}}{2}V_{dc}.$$

$V_1$ is the output voltage amplitude of the inverter, and $v_d$ is the D axis voltage. $v_q$ is the Q axis voltage, $V_{max}$ is the maximum output voltage of the inverter 4, and $V_{dc}$ is the DC bus voltage output by the rectifier 2.

In the embodiments of the present disclosure, the limiting circuit may obtain the D axis given current value according to the following formula (4).

$$I_{dref} = \begin{cases} 0 & I_{d0} > 0 \\ I_{d0} & I_{demag} < I_{d0} \leq 0 \\ I_{demag} & I_{d0} \leq I_{demag} \end{cases} \quad (4)$$

$I_{dref}$ is the D axis given current value, and $I_{demag}$ is the limit value of the motor demagnetization current.

In some embodiments, the calculation by the current control circuit 54 is as follows.

U, V, and W three-phase current values $I_u$, $I_v$, and $I_w$ are obtained by sampling the motor 7, and Clark transformation is performed by a three-phase stationary-two-phase stationary coordinate conversion unit. Based on the following formula (5), the currents $I_\alpha$ and $I_\beta$ of motors in α and β axis directions of the two-phase stationary coordinate system are obtained.

$$I_\alpha = I_u \quad (5)$$
$$I_\beta = \frac{I_u + 2I_v}{\sqrt{3}}$$

According to the estimated value $\theta_{est}$ of the rotor angle, the Park transformation is performed by the two-phase stationary-two-phase rotation coordinate conversion unit. The actual current values $I_q$, $I_d$ of the D axis and Q axis in the two-phase rotation coordinate system are calculated by the following formula (6):

$$I_d = I_\alpha \cos\theta_{est} + I_\beta \sin\theta_{est}$$
$$I_q = -I_\alpha \sin\theta_{est} + I_\beta \cos\theta_{est} \quad (6)$$

Further, the current control circuit 54 may calculate the Q axis given voltage value and the D axis given voltage value according to the following formula (7):

$$V_{d0} = K_{pd}(I_{dref} - I_d) + K_{id}\int_0^t [I_{dref}(\tau) - I_d(\tau)]d\tau$$
$$V_{q0} = K_{pq}(I_{qref} - I_q) + K_{iq}\int_0^t [I_{qref}(\tau) - I_q(\tau)]d\tau$$
$$V_d = V_{d0} - \omega L_q I_q$$
$$V_q = V_{q0} + \omega L_d I_d + \omega K_e \quad (7)$$

$V_q$ is the Q axis given voltage value, $V_d$ is the D axis given voltage value, $I_{qref}$ is the Q axis given current value, $I_{dref}$ is the D axis given current value, and $I_q$ is the Q axis actual current. $I_d$ is the D axis actual current, $K_{pd}$ and $K_{id}$ are the D axis current control proportional gain and integral gain, respectively, $K_{pq}$ and $K_{iq}$ are the Q axis current control proportional gain and integral gain. ω is the motor speed, $K_e$ is the back-EMF coefficient of the motor, $L_d$ and $L_q$ are the D axis and Q axis inductances respectively, and $\int_0^t [x(\tau)]d\tau$ represents the integral of x (τ) in time.

After obtaining the Q axis given voltage value Vq and the D axis given voltage value $V_d$, $V_q$ and $V_d$ are subjected to a Park inverse transformation through a two-phase rotation-two-phase stationary coordinate conversion unit according to the estimated value $\theta_{est}$ of the rotor angle to obtain voltage values $V_\alpha$ and $V_\beta$ on a fixed coordinate system. The specific transformation formula (8) is as follows:

$$\begin{cases} V_\alpha = V_d \cos\theta_{est} - V_q \sin\theta_{est} \\ V_\beta = V_d \sin\theta_{est} + V_q \cos\theta_{est} \end{cases} \quad (8)$$

θ is the rotor angle of the motor, and the above-mentioned estimated value $\theta_{est}$ of the rotor angle can be taken here.

Further, according to the voltage values $V_\alpha$ and $V_\beta$ on the fixed coordinate system, the inverse Clark conversion is performed through the two-phase stationary-three-phase stationary coordinate conversion unit to obtain three-phase voltages $V_u$, $V_v$, and $V_w$. The specific transformation formula (9) is as follows:

$$V_u = V_\alpha \quad (9)$$
$$V_v = \frac{-V_\alpha + \sqrt{3}V_\beta}{2}$$
$$V_w = \frac{-V_\alpha - \sqrt{3}V_\beta}{2}$$

The duty cycle calculation circuit can perform the duty cycle calculation based on the DC bus voltage $V_{dc}$ and the three-phase voltages $V_u$, $V_v$, and $V_w$ to obtain a duty cycle control signal, that is, the three-phase duty cycles $D_u$, $D_v$, and $D_w$. The specific calculation formula (10) is as follows:

$$D_u = (V_u + 0.5V_{dc})/V_{dc}$$
$$D_v = (V_v + 0.5V_{dc})/V_{dc}$$
$$D_w = (V_w + 0.5V_{dc})/V_{dc} \quad (10)$$

$V_{dc}$ is the DC bus voltage.

The three-phase duty cycle signal contains three pulse width signals. As shown in FIG. 3, Du1, Du2, Du3 duty signals corresponding to the duty ratio Du of one phase at different times. Finally, the corresponding three-way PWM control signal is generated by the triangular carrier signal generated by the timer in the operation controller to the upper-arm three-way switch of the inverter. The three control signals of the lower arm corresponds to the three complementary PWM control signals. Thus, the three-phase duty cycle signal actually contains six PWM control signals. Finally, the six-way switch transistor of the inverter 4 is controlled according to the six-way PWM control signals corresponding to the three-phase duty ratios $D_u$, $D_v$, and $D_w$, so as to drive the motor 7 to operate.

In the present embodiment, the operation controller 5 may calculate the phase currents Iu, Iv, and Iw of the motor 7 through the position-speed estimation circuit 51, the Q axis given current value $I_{qref}$ calculation circuit 52, the D axis given current value $I_{dref}$ calculation circuit 53 and the current control circuit. The six-phase PWM signals based on the three-phase duty cycle signals Du, Dv, and Dw are output to the inverter 4 to drive the motor 7 to operate.

In some embodiments, as shown in FIG. 1, the system further includes a power factor correction (PFC) circuit 3 connected in parallel with the DC bus, an input end of the PFC circuit being connected to the rectifier 2, and an output end of the PFC circuit being connected to the filter circuit 6 to perform a power factor correction on a pulsating DC power output by the rectifier 2. The PFC circuit 3 includes a reactor L connected in series with the output end of the rectifier 2, and may further include a second capacitor C1, a diode D5, and a switch S7. The first end of reactor L is connected to the positive output end of the rectifier, the second end of reactor L is connected to the anode of diode D5, and the second capacitor C1 is connected in parallel to the first end of reactor L and the cathode of the diode. The collector of the switch S7 is connected to the anode of the diode D5, the emitter of the switch S7 is connected to the DC bus ground end, and the control unit 5 of the switch S7 is connected. The control unit 5 outputs a control signal to control the switching state of the switch transistor S7 to control the operation of the PFC circuit 3 to implement power factor correction for the pulsating DC power output by the rectifier 2.

The present disclosure further provides an inverter air conditioner, including an outdoor unit and an indoor unit. The outdoor unit controller and/or the indoor unit controller may include the system for controlling the motors according to the embodiments of the present disclosure. For example, the indoor unit can include two indoor DC fans, and the motors 7 and 9 of the system for controlling the motors are the motors of the two indoor DC fans, respectively. As another example, the outdoor unit can include an outdoor DC fan and a compressor, and the motor 7 of the system for controlling the motors is the motor of the outdoor DC fan and the motor 9 is a permanent magnet synchronous motor of the compressor. The system for controlling the motors based on the embodiments of the present disclosure realizes the above-mentioned motor load control operation of the inverter air conditioner by a low-cost MCU including only one AD sampling circuit.

In the description of this specification, the description with reference to the terms "first embodiment," "second embodiment," "example" and the like means that a specific method, device, or feature described in conjunction with the embodiment or example is included in at least one embodiment or example of the present disclosure. In this specification, the schematic expressions of the above terms are not necessarily directed to the same embodiment or example. Moreover, the particular features, methods, devices, or characteristics described may be combined in any suitable manner in any one or more embodiments or examples. In addition, without any contradiction, those skilled in the art may combine different embodiments or examples described in this specification and features of different embodiments or examples.

The above are only preferred embodiments of the present disclosure, and thus do not limit the scope of the present disclosure. Any equivalent structure or equivalent process transformation made by using the description and drawings of the present disclosure is included in the scope of the present disclosure.

What is claimed is:

1. A motor control system comprising:
a plurality of inverters each configured to be connected to a corresponding one of a plurality of motors;
a plurality of current samplers coupled to the plurality of inverters, respectively, and each configured to sample a phase current of a corresponding one of the plurality of motors to generate a phase current signal for the corresponding one of the plurality of motors; and
an operation controller including an analog-digital (AD) sampling circuit, the operation controller being configured to:
synchronously generate a plurality of triangular carrier signals each corresponding to one of the plurality of motors; and
sample the phase current signals of the plurality of motors in a time sharing manner through the AD sampling circuit in rising half cycles or falling half cycles of the plurality of triangular carrier signals, respectively, the half cycles of the triangular carrier signals for sampling the phase current signals of the plurality of motors being staggered in time from each other.

2. The system of claim 1, wherein:
the motors include a first motor and a second motor;
the triangular carrier signals include a first triangular carrier signal corresponding to the first motor and a second triangular carrier signal corresponding to the second motor; and
a ratio of a first frequency of the first triangular carrier signal to a second frequency of the second triangular carrier signal is 1:N, N being an integer greater than or equal to 1.

3. The system of claim 2, wherein N is greater than or equal to 1 and less than or equal to 5.

4. The system of claim 3, wherein:
the ratio of the first frequency to the second frequency is 1:1; and
the operation controller is further configured to:
sample the phase current signal of the first motor during a rising half cycle of the first triangular carrier signal; and
sample the phase current signal of the second motor during a falling half cycle of the second triangular carrier signal, the rising half cycle of the first triangular carrier signal and the falling half cycle of the second triangular carrier signal forming a cycle.

5. The system of claim 3, wherein
the ratio of the first frequency to the second frequency is 1:2; and
the operation controller is further configured to:
sample the phase current signal of the first motor during a rising half cycle of a cycle of the first triangular carrier signal; and
sample the phase current signal of the second motor during a rising half cycle of a cycle of the second triangular carrier signal, the cycle of the second triangular carrier signal corresponding to a falling half cycle of the cycle of the first triangular carrier signal.

6. The system of claim 3, wherein:
the ratio of the first frequency to the second frequency is 1:2; and
the operation controller is further configured to:
sample the phase current signal of the first motor during a rising half cycle of a cycle of the first triangular carrier signal; and
sample the phase current signal of the second motor during a falling half cycle of a cycle of the second triangular carrier signal, the cycle of the second triangular carrier signal corresponding to a falling half cycle of the cycle of the first triangular carrier signal.

7. The system of claim 3, wherein:
the ratio of the first frequency to the second frequency is 1:2; and
the operation controller is further configured to:
sample the phase current signal of the first motor during a falling half cycle of a cycle of the first triangular carrier signal; and
sample the phase current signal of the second motor during a rising half cycle of a cycle of the second triangular carrier signal, the cycle of the second triangular carrier signal corresponding to a rising half cycle of the cycle of the first triangular carrier signal.

8. The system of claim 3, wherein:
the ratio of the first frequency to the second frequency is 1:2; and the operation controller is further configured to:
sample the phase current signal of the first motor during a falling half cycle of a cycle of the first triangular carrier signal; and
sample the phase current signal of the second motor during a falling half cycle of a cycle of the second triangular carrier signal, the cycle of the second triangular carrier signal corresponding to a rising half cycle of the cycle of the first triangular carrier signal.

9. The system of claim 1, wherein:
the motors include a first motor, a second motor, and a third motor;
the triangular carrier signals include a first triangular carrier signal corresponding to the first motor, a second triangular carrier signal corresponding to the second motor, and a third triangular carrier signal corresponding to the third motor; and
a ratio of a first frequency of the first triangular carrier signal to a second frequency of the second triangular carrier signal to a third frequency of the third triangular carrier signal is 1:M1:M2, M1 being an integer greater than or equal to 2, and M2 being an integer greater than or equal to 2.

10. The system of claim 9, wherein:
M1 is greater than or equal to 2 and less than or equal to 5; and
M2 is greater than or equal to 2 and less than or equal to 5.

11. The system of claim 1, further comprising:
a DC bus;
a rectifier configured to perform a full-wave rectification on an AC input voltage, two output ends of the rectifier being connected to the DC bus; and
a filter circuit;
wherein:
the filter circuit and the inverters are connected in parallel with the DC bus in sequence; and
the AC input voltage is converted into a DC bus voltage after being processed by the rectifier and the filter circuit, to provide power for the plurality of inverters.

12. The system of claim 11, further comprising:
a voltage sampler configured to sample a value of the DC bus voltage and input the value to the operation controller.

13. The system of claim 12, wherein the operation controller is configured to:
generate a plurality of pulse width signals according to the phase current signals of the plurality of motors, the value of the DC bus voltage, and target rotation speed values of the plurality of motors;
generate pulse width modulation (PWM) control signals according to the triangular carrier signals and the pulse width signals; and
control the plurality of inverters according to the PWM control signals to drive the plurality of motors to operate.

14. The system of claim 13, wherein the operation controller includes:
a position-speed estimation circuit configured to, for a motor of the plurality of motors, estimate a position of a rotor of the motor to obtain an estimated value of a rotor angle and an estimated value of a motor speed;
a Q axis given current value calculation circuit configured to calculate a Q axis given current value according to the target rotation speed value of the motor and the estimated value of the motor speed;
a D axis given current value calculation circuit configured to calculate a D axis given current value according to a maximum output voltage and an output voltage amplitude of the inverter corresponding to the motor; and
a current control circuit configured to calculate the pulse width signal corresponding to the motor according to the Q axis given current value, the D axis given current value, the estimated value of the motor speed, the value of the DC bus voltage, and the phase current value sampled from the motor, and generate the PWM control signal corresponding to the motor.

15. The system of claim 11, further comprising:
a power factor correction (PFC) circuit connected in parallel with the DC bus, an input end of the PFC circuit being connected to the rectifier, and an output end of the PFC circuit being connected to the filter circuit.

16. An inverter air conditioner comprising:
a plurality of motors; and
a motor control system comprising:
a plurality of inverters connected to the plurality of motors, respectively;
a plurality of current samplers coupled to the plurality of inverters, respectively, and each configured to sample a phase current of a corresponding one of the plurality of motors to generate a phase current signal for the corresponding one of the plurality of motors; and
an operation controller including an analog-digital (AD) sampling circuit, the operation controller being configured to:
synchronously generate a plurality of triangular carrier signals each corresponding to one of the plurality of motors; and
sample the phase current signals of the plurality of motors in a time sharing manner through the AD sampling circuit in rising half cycles or falling half cycles of the plurality of triangular carrier signals, respectively, the half cycles of the triangular carrier signals for sampling the phase current signals of the plurality of motors being staggered in time from each other.

17. The inverter air conditioner of claim 16, wherein:
the motors include a first motor and a second motor;
the triangular carrier signals include a first triangular carrier signal corresponding to the first motor and a second triangular carrier signal corresponding to the second motor; and
a ratio of a first frequency of the first triangular carrier signal to a second frequency of the second triangular carrier signal is 1:N, N being an integer greater than or equal to 1.

18. The inverter air conditioner of claim 17, wherein:
the ratio of the first frequency to the second frequency is 1:1; and
the operation controller is further configured to:
sample the phase current signal of the first motor during a rising half cycle of the first triangular carrier signal; and
sample the phase current signal of the second motor during a falling half cycle of the second triangular carrier signal, the rising half cycle of the first triangular carrier signal and the falling half cycle of the second triangular carrier signal forming a cycle.

19. The inverter air conditioner of claim 17, wherein
the ratio of the first frequency to the second frequency is 1:2; and
the operation controller is further configured to:
  sample the phase current signal of the first motor during a rising half cycle of a cycle of the first triangular carrier signal; and
  sample the phase current signal of the second motor during a rising half cycle or a falling half cycle of a cycle of the second triangular carrier signal, the cycle of the second triangular carrier signal corresponding to a falling half cycle of the cycle of the first triangular carrier signal.

20. The inverter air conditioner of claim 17, wherein:
the ratio of the first frequency to the second frequency is 1:2; and
the operation controller is further configured to:
  sample the phase current signal of the first motor during a falling half cycle of a cycle of the first triangular carrier signal; and
  sample the phase current signal of the second motor during a rising half cycle or a falling half cycle of a cycle of the second triangular carrier signal, the cycle of the second triangular carrier signal corresponding to a rising half cycle of the cycle of the first triangular carrier signal.

* * * * *